United States Patent [19]

Watanabe et al.

[11] Patent Number: 4,975,913
[45] Date of Patent: Dec. 4, 1990

[54] PROGRAMMABLE MULTIPLEXING/DEMULTIPLEXING SYSTEM

[75] Inventors: Toshiaki Watanabe, Kawasaki; Kazuo Murano, Tokyo; Tetsuo Soejima, Tama, all of Japan

[73] Assignee: Fujitsu Limited, Kawasaki, Japan

[21] Appl. No.: 250,167

[22] Filed: Sep. 28, 1988

[30] Foreign Application Priority Data

Sep. 30, 1987 [JP] Japan .................................. 62-244278
Sep. 30, 1987 [JP] Japan .................................. 62-244279
Sep. 30, 1987 [JP] Japan .................................. 62-244283

[51] Int. Cl.⁵ .............................................. H04J 3/04
[52] U.S. Cl. ..................................................... 370/112
[58] Field of Search .................. 370/112, 100.1, 105.3, 370/102; 375/118, 111, 106, 108, 119

[56] References Cited

U.S. PATENT DOCUMENTS 4,280,099  7/1981  Rattlingourd ........................ 375/119
4,445,215  4/1984  Svendsen ............................. 370/112
4,627,080  12/1986 Debus, Jr. ............................ 375/119
4,811,341  3/1989  Fujimoto et al. .................... 370/112

FOREIGN PATENT DOCUMENTS 0007209  1/1980  European Pat. Off. .
0067384  12/1982 European Pat. Off. .
0228213  7/1987  European Pat. Off. .
2145907  4/1985  United Kingdom .

OTHER PUBLICATIONS

European Search Report for EPA 88-11-6068, The Hague, 03/13/89.
R. Perrin, "A pair of MOS/LSI Devices Designed to Communicate"; Proceedings of the National Conference, vol. 28, Oct. 1973, pp. 249-257; Newport Beach, Calif.
W. Twaddell, "Telecommunications ICs"; Electrical Design News, vol. 29, No. 6, Mar. 1984, pp. 1-148, 150, 152; Boston, U.S.
S. Mano et al., "System Design for Digital Subscribers Loops"; Review of the Electrical Communication Laboratories, vol. 32, No. 2, part 2, 1984, pp. 351-364; Tokyo, Japan.
G. Geiger, "IDSN Chipset and Product Requirements"; WESCON 86/Conference Record, vol. 30, Nov. 18th-20th, 1986, pp. 10/1-10/7; Los Angeles, U.S.

Primary Examiner—Douglas W. Olms
Assistant Examiner—Wellington Chin
Attorney, Agent, or Firm—Staas & Halsey

[57] ABSTRACT

A programmable multiplexing/demultiplexing system used in a digital communication network, suitable for an ISDN to be developed. The system including a phase adjusting unit, a bit length varying unit, a start timing control unit, and a processor which variably controls the three units. The phase adjusting unit variably controls the phase of an internal clock in accordance with received data, and the thus-adjusted clock is used by the remaining two units. The bit length varying unit variably controls the bit length of the received data. The start timing control variably controls the start timing of each transmission and reception processing carried out alternately by the processor.

25 Claims, 21 Drawing Sheets (a) NORMAL TIME (b) TEST TIME

PROGRAMMABLE MULTIPLEXING/DEMULTIPLEXING SYSTEM

BACKGROUND OF THE INVENTION

1. Field of the Invention

The present invention relates to a programmable multiplexing/demultiplexing system. A worldwide Integrated Service Digital Network (ISDN) is being developed, and a standardization thereof is being studied by CCITT. As well known, in the ISDN, voice, data, and image etc., signals output from many different types of terminal equipment are converted to digital signals, and various services are provided by processing these digital signals.

When constructing an ISDN, i.e., forming a new communication network, a wide range of communication apparatuses, and at the same time, communication software, must be developed, and thus from the hardware viewpoint, many kinds of large scale integrated circuits (LSI's) also must be developed. Development of the ISDN is still in the initial stages, and therefore, no specific definitions of the kinds of functions and services to be provided by the ISDN have been formulated. Under these circumstances, it is obvious that facilities which can adaptively cope with future service needs must be developed.

2. Description of the Related Art

In regard to the above, from the economical viewpoint, it is very risky to develop many new LSI's, especially since it would be difficult to cope with modifications of or additions to the functions of the ISDN by attempting to develop an exclusive LSI for each modification and addition, moreover, if an LSI has not been developed for a particular function, the costs of developing such an LSI, and the time and labor spent thereon would be unwarranted. Further, the design of a new LSI is time-consuming, and accordingly, a rapid development thereof is not possible, which means that a quick response to future service needs would be difficult to accomplish.

SUMMARY OF THE INVENTION

Accordingly, an object of the present invention is to provide a programmable multiplexing/demultiplexing system which can be built by using a single exclusive LSI. This exclusive LSI can provide the various bit processing functions which would be realized in the prior art by employing a plurality of exclusive LSI's.

To attain the above object, the programmable multiplexing/demultiplexing system according to the present invention is constructed in such a manner that the system is operated by an exclusive LSI containing therein, at least, a processor, a phase adjusting means, a bit length varying means, and a start timing control means, as one body.

The phase adjusting means is used for a variable control of the phase of a clock signal by the processor with respect to received data; the bit length varying means is used for a variable control of the length of the received data by the processor when latched with a clock signal having a phase which has previously been adjusted by the phase adjusting means; and the start timing control means is used for varying a start timing of the processing of data received by the processor, after the processor has processed data to be transmitted.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
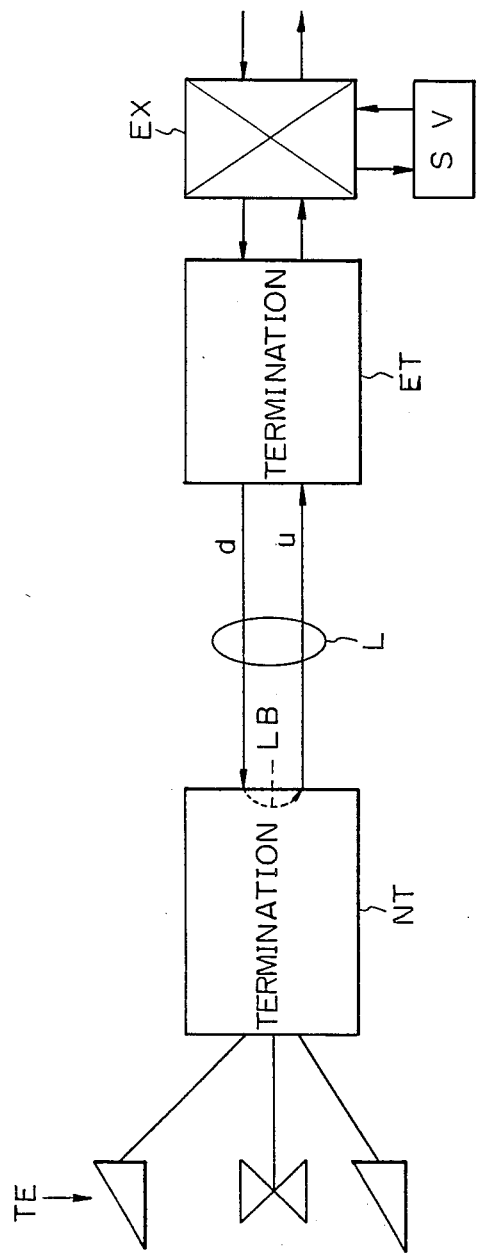
FIG. 1 shows a block diagram of a system to which the present invention is applied.

FIG. 1 shows an example of a system to which the present invention is applied. In the figure, the present invention is preferably applied to a terminating equipment ET for an exchange and/or a terminating equipment NT for a subscriber. The terminating equipment ET for an exchange is connected, via a transmission line L (corresponding, in this example, to a subscriber line), to the terminating equipment NT for a subscriber. NT and ET are ISDN symbols, and this equipment is usually called a digital service unit (DSU), and the terminating equipment ET is usually called an office channel unit (OCU). These units NT and ET are located between a center side exchange EX and terminal unit TE, such as a facsimile unit, a telephone, a personal computer, and the like.

The programmable multiplexing-demultiplexing system (hereinafter, often referred to briefly as MUX- /DMUX system) is formed in the terminating equipment NT and/or the terminating equipment ET, and the nucleus thereof, according to the present invention, is the above-mentioned exclusive LSI.

Figure 2:
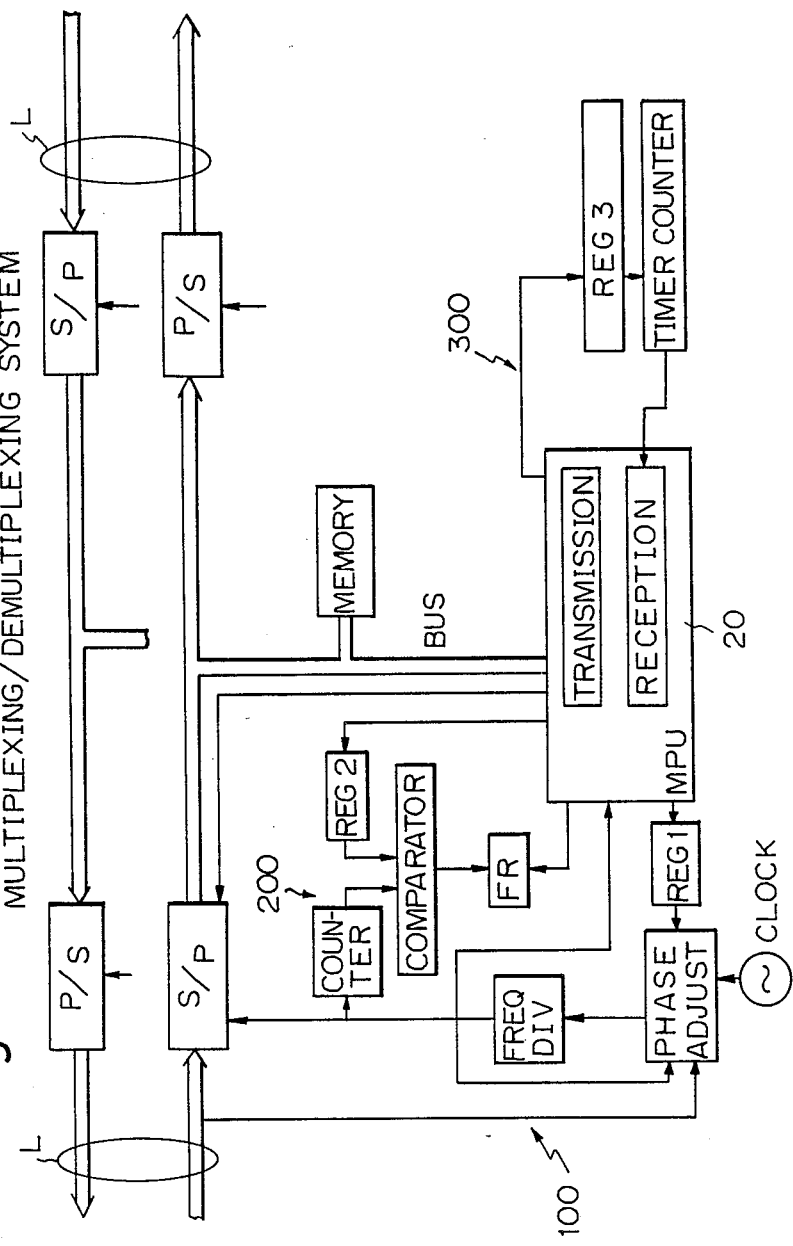
FIG. 2 is a general block diagram of the system according to the present invention.

FIG. 2 is a general and simplified view of the system according to the present invention. The programmable multiplexing/demultiplexing system (MUX/DMUX system) 10 is mainly comprised of a phase adjusting means 100, a bit length varying means 200, a start timing control means 300, and a processor (MPU) 20. The phase adjusting means 100 includes a phase adjusting unit, a first register (REG1), and a frequency divider (FREQ DIV). The bit length varying means 200 includes a counter, a second register (REG2), a comparator, and a flag register (FR). The start timing control means 300 includes a third register (REG3) and a timer counter. The processor 20 processes data transmissions and receptions, together with a memory, via a bus. S/P indicates a serial/parallel converter and P/S a parallel/serial converter. Each serial/parallel converter (S/P) is formed as a latch circuit for momentarily storing the received data converted into parallel data.

The operation of the MUX/DMUX system and details of the construction thereof will now be described. Note, the means 100, 200, and 300 will be described separately and independently, for a clear explanation of each means, and this description will include a description of the arts related to each means.

Phase adjusting means 100

In a digital communication network, usually data, having a clock $CK_e$, is sent via a transmission line and is received by a receiving apparatus having an internal clock $CK_i$. In this case, if the $CK_i$ does not follow the $CK_e$, it is impossible to correctly process the data, and as a result, errors occur. To prevent this, a clock phase synchronizing circuit is mounted in the receiving apparatus. In general, the clock phase synchronizing circuit is constructed as a digital phase-lock loop (DPLL).

Figure 3:
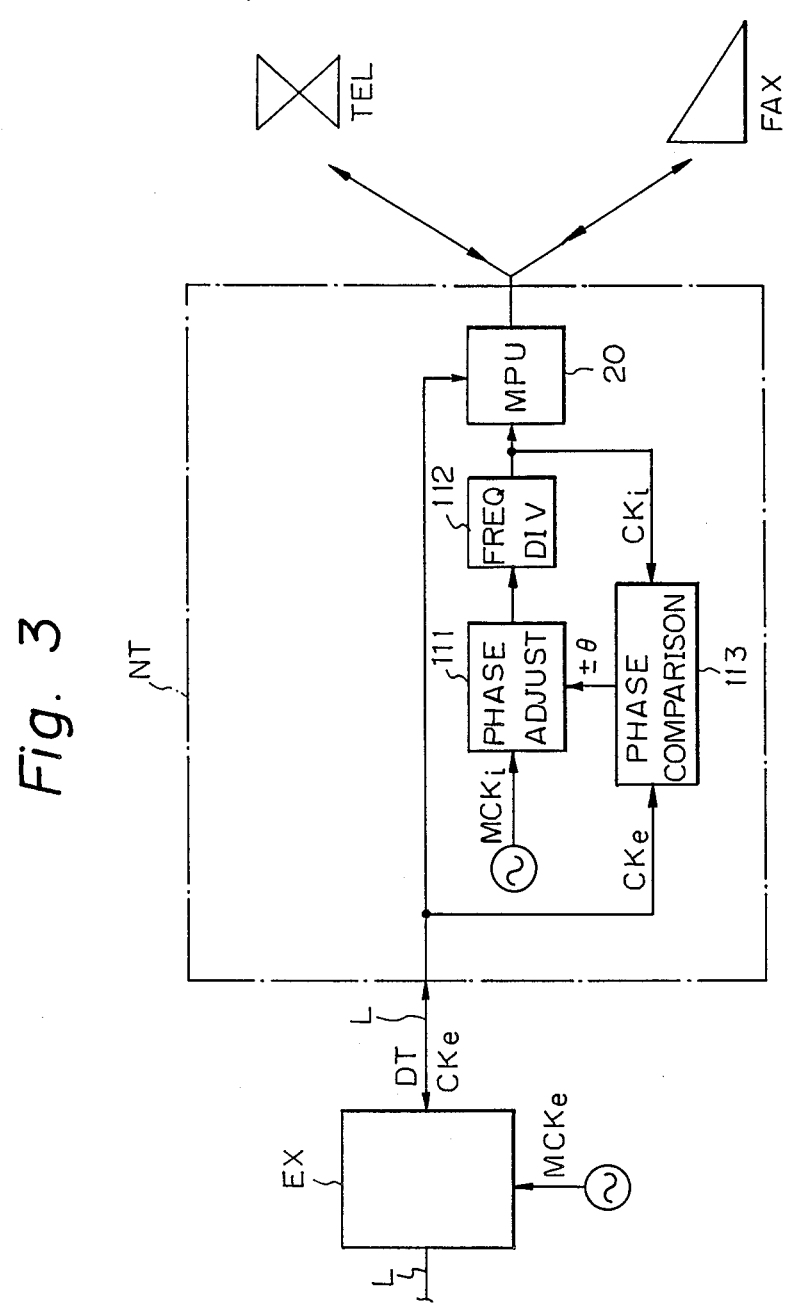
FIG. 3 shows block diagram of a conventional phase adjusting means.

FIG. 3 is a view showing an example of a conventional phase adjusting means in the MUX/DMUX system which is part of a usual digital communication network. Data DT output from an exchange EX having a transmission line L is sent to a terminating equipment NT for a subscriber and finally to a terminal unit TE, for example, a facsimile unit, a telephone, or a personal computer, etc.

The exchange EX includes a master clock source for generating a master clock $MCK_e$ and outputs data DT synchronized with an external clock $CK_e$, obtained by dividing the master clock $MCK_e$, to the transmission line L. The terminating equipment NT receiving the data DT has its own master clock source for generating a master clock $MCK_i$. The master clock $MCK_i$ is divided by a frequency divider 112 to obtain an internal clock $CK_i$ by which a variety of circuits, such as a processor 20 and so on, are operated. In this case, the clock $CK_i$ needs to be synchronized with an external clock $CK_e$ which is extracted from the received serial data DT. Accordingly, a phase comparison unit 113 determines whether the internal clock $CK_i$ is lagging or leading in phase with respect to the external clock $CK_e$. A phase adjusting unit 111 is informed of this lag or lead and effects a pulse insertion (in the case of a lag) or a pulse removal (in the case of a lead), both in pulse units, to or from a clock signal, i.e., the master clock $MCK_i$.

The amount of the above-mentioned lag or lead phase ($\pm \theta$) is received by the phase adjusting unit, and the above pulse insertion or removal is carried out at every clock. Nevertheless, when such a phase adjustment is carried out at every clock, an unpreferable jitter appears in the internal clock $CK_i$. Further, when the phase is promptly adjusted even when a noise appears only momentarily, this unpreferable jitter is emphasized.

In the above circumstances, a protection stage number is employed so that the pulse insertion or removal is not carried out at every clock. Namely, assuming that the protection stage number is set at ⌈10⌋, a pulse insertion is not carried out until a lag in phase has occurred 10 times continuously, or a pulse removal is not carried out until a lead in phase has occurred 10 times continuously; i.e., a hysteresis control is realized, and thus the internal clock $CK_i$ is stabilized.

In the above example, the pulse insertion or removal is not carried out until the lag or lead in phase has occurred 10 times continuously. Accordingly, for example, even at a power-ON or when an input signal is not synchronized, the pulse insertion or pulse removal is carried out by using the number 10 as a standard. But this raises a problem because a considerably long time must elapse before an acquisition of synchronism, when establishing phase synchronization.

Further, at a power-ON and when the input signal is not synchronized, the time allowed for the acquisition of synchronism is only several 10 μs. Thus another problem arises in that, even if a considerably long time has elapsed when establishing a phase synchronization, it is impossible for an operator to select a suitable protection stage number before and after an acquisition of synchronism within such a very short time.

The phase adjusting means 100 rapidly carries out a phase adjustment before the acquisition of synchronism, and realizes the phase adjustment with a satisfactory predetermined protection stage number after the acquisition of synchronism. Furthermore, it carries out the phase adjustment without the need for it manual operation.

Figure 4:
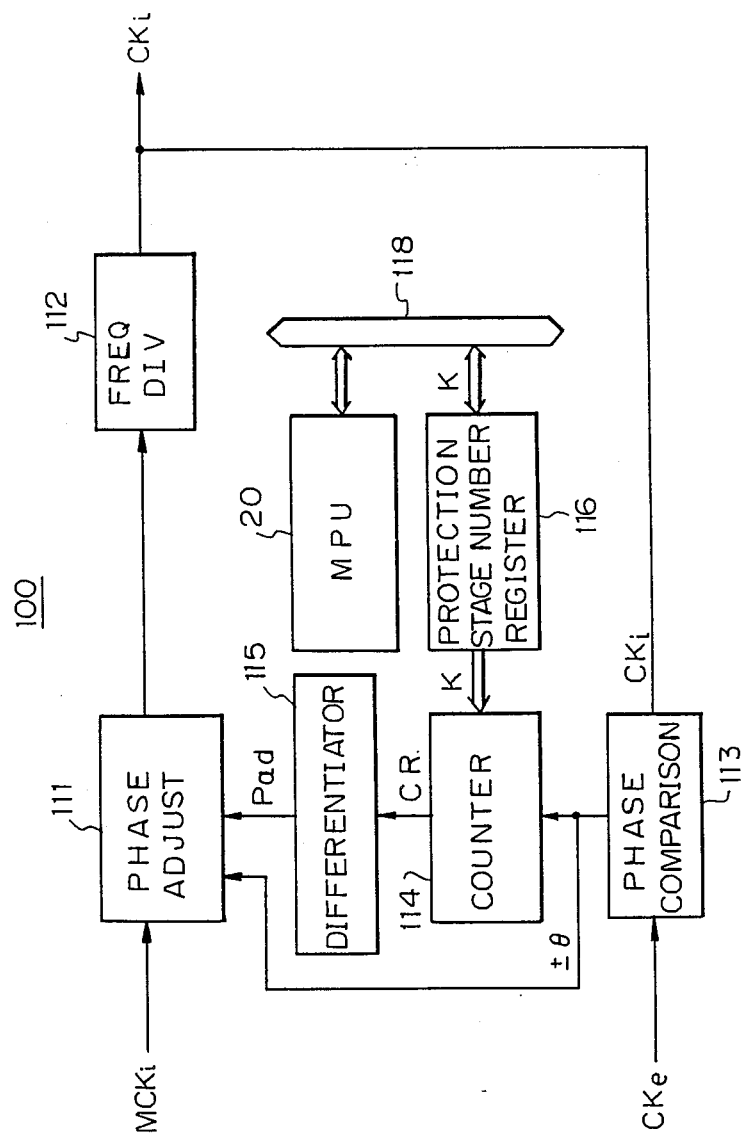
FIG. 4 is a block diagram showing the principle of the phase adjusting means of the present invention.

FIG. 4 is a structural view showing the principle of the phase adjusting means of the present invention. In the figure, the phase adjusting means 100, the phase adjusting unit 111, the frequency divider 112, and the phase comparison unit 113 are identical to those shown in FIG. 3. According to the present invention, a counter 114 is provided between the phase comparison unit 113 and the phase adjusting unit 111. The counter 114 cooperates with a protection stage number register 116 (see REG1 in FIG. 2) which is also connected, via a bus 118, to the processor 20. The carry output CR from the counter 114 is formed, via a differentiator 115, as a phase adjusting pulse $P_{ad}$ and is applied to the phase adjusting unit 111.

The protection stage number can be varied by a combination of the counter 114 and the protection stage number register 116. Further, an initial value K to be set in the register 116, i.e., the protection stage number, is given in real time from the processor 20 via the bus 118.

Before an acquisition of synchronism, the processor 20 specifies, for example, ⌈3⌋, as the protection stage number, thus a rapid phase synchronization is realized. After an acquisition of synchronism, the processor 20 specifies, for example, ⌈10⌋, as the protection stage number, thus a stable phase synchronization, without jitter, is obtained. In both of the above cases, the protection stage number is specified by the processor 20. Therefore, the protection stage number can be varied at a very high speed.

Figure 5:
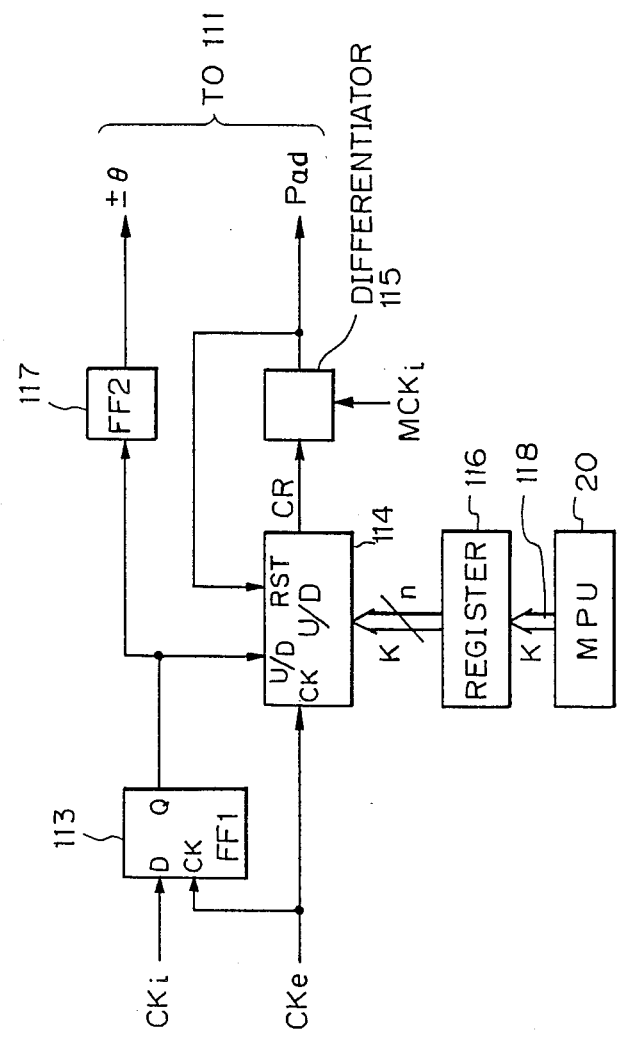
FIG. 5 is a block diagram of a section of the phase adjusting means.

FIG. 5 shows a specific example of a part of FIG. 4. The phase comparison unit 113 is formed by a D-type flip-flop (FF1) which detects a lag or lead in phase of the internal clock $CK_i$ with respect to the external clock $CK_e$. The lag or lead phase information ($\pm\theta$) is momentarily latched by a second flip-flop 117 (FF2) and then output to the phase adjusting unit 111. Also, the lag or lead phase information ($\pm\theta$) is sent to the Up/Down counter 114, and received at the U/D input thereof. In the counter 114, when the phase is lagging ("0"), the Up input is activated, and when the phase is leading ("1"), the Down input is activated.

The initial value K to be preset in the U/D counter 114 is supplied, according to the present invention, from the protection stage register 116, where the value K is specified by the processor 20 via the bus 118. Note that the processor 20 comprises a RAM, ROM, ALU and so on (illustrated later), and carries out an overall control of the terminating equipment NT (FIG. 3) other than the aforesaid specification of the initial value K.

If the U/D counter 114 overflows or underflows, a carry output CR is produced therefrom. Assuming that the protection stage number is set at ⌈10⌋, the carry output CR is sent when the phase lag has occurred 10 times continuously, or when the phase lead has occurred 10 times continuously. The carry output CR is passed through the differentiator 115 and shaped into a narrow pulse, which becomes the phase adjusting pulse $P_{ad}$ applied to the phase adjusting unit 111.

Figure 6:
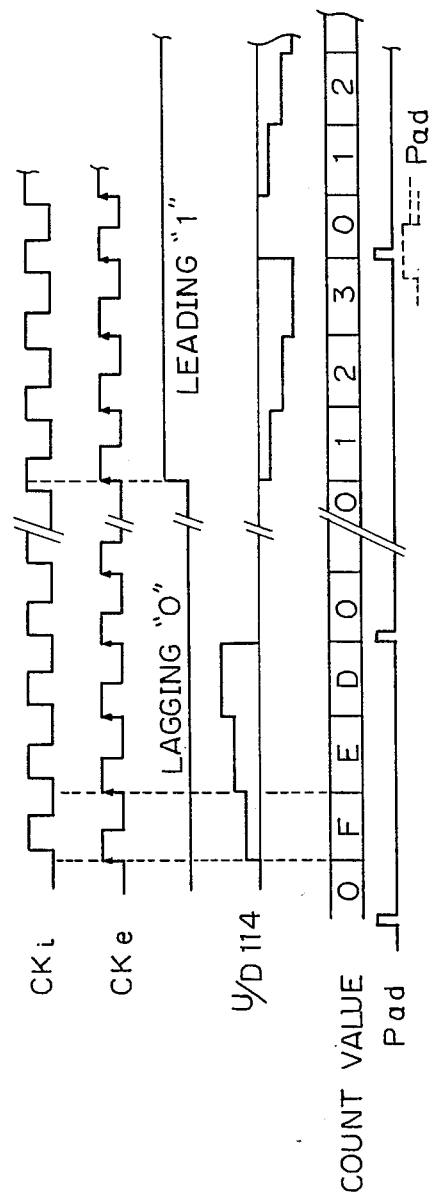
FIG. 6 is a timing chart indicating the status at each major portion in FIG. 5.

FIG. 6 is a timing chart indicating status at each major portion in FIG. 5, and specifically indicates the status in which the internal clock $CK_i$ is changed from a lag in phase to a lead in phase with respect to the external clock $CK_e$. Assuming that it is a power-ON time or the input signal is out of synchronism, the processor 20 specifies, for example, ⌈3⌋, as the protection stage number K, to realize a rapid acquisition of synchronism, but after an acquisition of synchronism specifies, for example, ⌈10⌋, as the protection stage number K. Accordingly, the carry output CR is produced every time the count value of the U/D counter 114 rises to ⌈3⌋ and, as a result, the phase adjusting pulse $P_{ad}$ is output. When a lagging phase is made a leading phase, the carry output CR is produced every time the count value of the U/P counter 114 descends to −3 and as a result, the phase adjusting pulse $P_{ad}$ is output. The count value is reset (RST) by the pulse $P_{ad}$.

Figure 7:
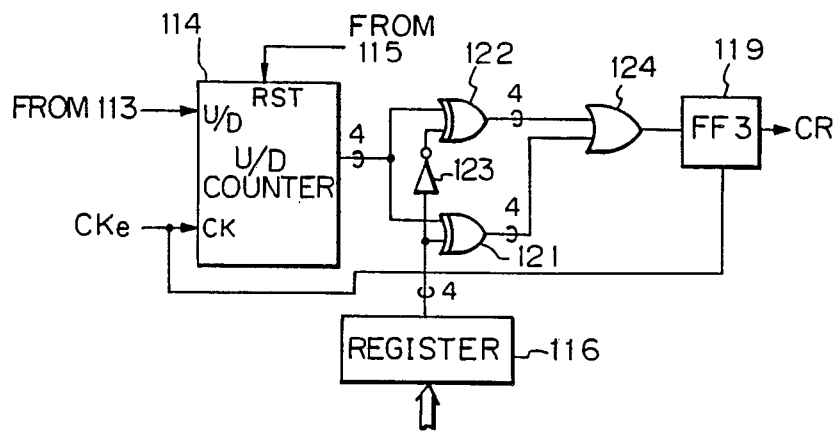
FIG. 7 is a block diagram of a U/D counter.

FIG. 7 shows a detailed example of a U/D counter, and particularly, the output portion of the carry output CR is illustrated in detail. The count value of the U/D counter 114, consisting of, for example, 4 bits, is compared with the protection stage number, such as ⌈3⌋ or ⌈10⌋, stored in the protection stage number register 116. The comparison is obtained by the use of exclusive OR (EOR) gates 121 and 122. The EOR gate 121 is used to compare a limit value of the up side, and the EOR gate 122 is used to compare a limit value of the down side, for example, ⌈+3⌋ and ⌈−3⌋, respectively. An inverter 123 is provided to create, according to the example, ⌈−3⌋.

If a coincidence is detected, i.e., according to the above-mentioned example, when the lag phase has continued 3 times or the lead phase has continued 3 times, "1" is output from an OR gate 124 and is momentarily latched, at a timing of the external clock $CK_e$, at a flip-flop 119 (FF3) to produce the carry output CR.

Figure 8:
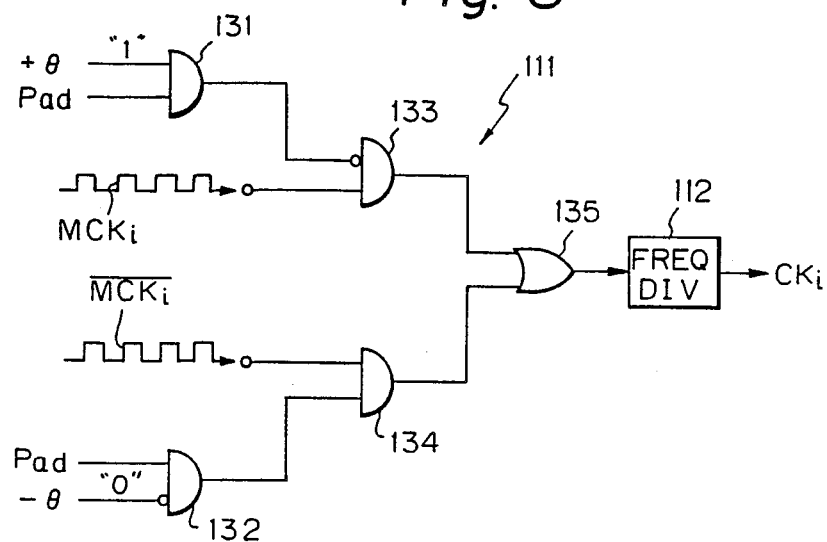
FIG. 8 is a circuit diagram of a phase adjusting unit.

FIG. 8 shows an example of a phase adjusting unit. In the unit, an inverted master clock $\overline{MCK_i}$ is generated which results in a shift in phase by $\pi$ radians relative to the master clock $MCK_i$. And AND gates 133 and 134 are provided to receive these clocks $MCK_i$ and $\overline{MCK_i}$ at the inputs thereof. The AND gates 131 and 132 are selectively conductive (high) only when the phase adjusting pulse $P_{ad}$ exists. The gate to be conductive is determined by whether the phase is leading ("1") or lagging ("0"). Where the phase is not leading ($+\theta =$ "0") and the $P_{ad}$ does not exist, the output from the AND gate 131 becomes "0", so that the AND gate 133 is conductive. Thus the $MCK_i$ passes through an OR gate 135 and the frequency divider 112 to produce the internal clock $CK_i$. Namely, in general, the master clock $MCK_i$ is always supplied from the OR gate 135.

Where the phase is leading ($+\theta =$ "1") and the $P_{ad}$ exists ($P_{ad} =$ "1"), the output of the AND gate 131 becomes "1". Therefore, the AND gate 133 is closed only during the existence of the $P_{ad}$, whereby one pulse of the $MCK_i$ is removed to obtain the $CK_i$ which is lagging in phase. To be specific, during the phase lead, the master clock is masked (cancelled) by the pulse $P_{ad}$ having a pulse width slightly wider than the pulse width of the $MCK_i$. The wider pulse $P_{ad}$ is shown by a broken line in FIG. 6.

Where the phase is lagging ($-\theta =$ "0") and the adjusting pulse exists ($P_{ad} =$ "1"), the output of the AND gate 132 becomes "1" and the AND gate 134 is conductive. Accordingly, one pulse of the $\overline{MCK_i}$ is inserted between two adjacent pulses of the master clock $MCK_i$, so that the internal clock $CK_i$ leading in phase is obtained. To be specific, during the phase lag, the master clock is supplied with a pulse between two adjacent master clock pulses.

Figure 9:
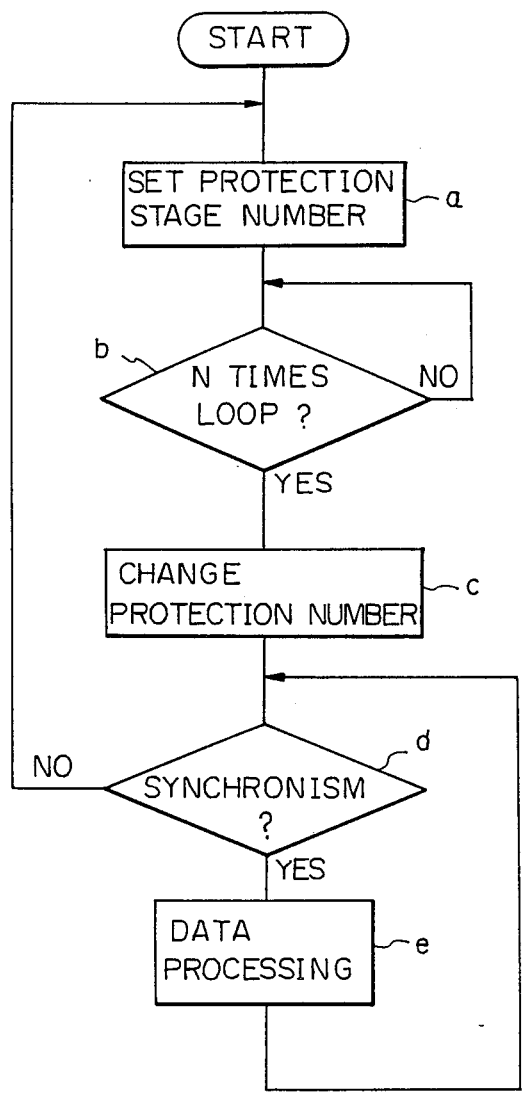
FIG. 9 is a flow chart of an operation of a processor.

FIG. 9 is a flow chart of an operation of a processor. The process shown by this flow chart starts, in the case of a power-ON or where the input signal is out of synchronism. In this example, the protection stage number is set to a small value, for example, ⌈3⌋, (refer to step a). This process makes a rapid acquisition of synchronism possible, by executing a control loop N times under the thus set number N (refer to step b). Note, N is usually determined from experience. After the N times execution, an acquisition of synchronism will be completed at a very high probability, and therefore, the protection stage number is changed to a usual protection stage number, for example, ⌈10⌋, (refer to step c). Thus, a stabilized internal clock $CK_i$, i.e., jitterless clock, can be obtained. At this step, establishment of the acquisition of synchronism is expected, and this is confirmed at step d. If the result is "NO", the prior steps are repeated from the beginning, and if the result is "YES", a usual data processing is commenced (refer to step e).

Bit length varying means 200

When serial input received data from the transmission line L is processed by a processor and output to another transmission line, the above serial/parallel (S/P) converter must be employed. For example, an LSI performing a bit processing for a transmission, and an LSI performing a bit processing for a line termination and the like, are equivalent to the S/P converter, per se. However, there is a demand that the functions of such LSI's be increased, to cope with future ISDN requirements.

Figure 10:
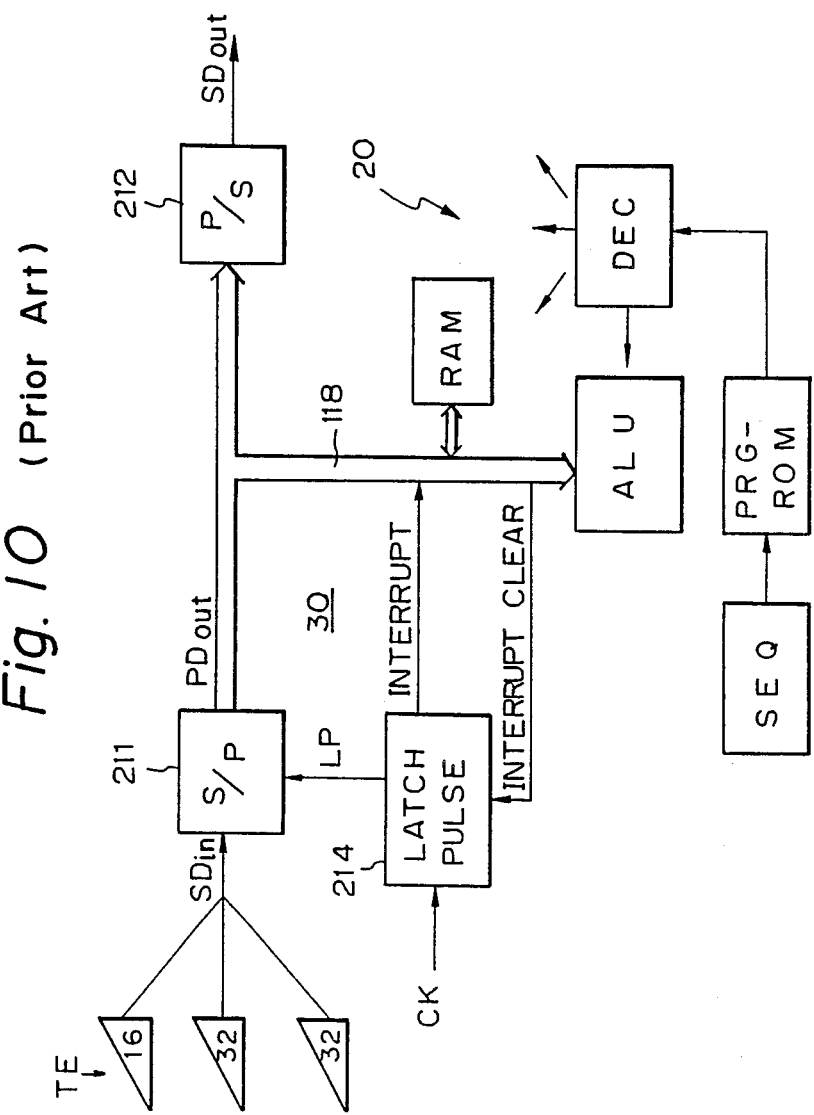
FIG. 10 is a block diagram of a prior art serial/parallel converter.

FIG. 10 shows an example of a prior art serial/parallel converter, wherein 211 is a converting unit forming a major part of the serial/parallel (S/P) converter. The converting unit 211 cooperates with the processor 20 to convert a serial input received data SD$_{in}$ into a parallel output data (PD$_{out}$) in a unit of a predetermined number of n bits (n is a positive integer). Note that the term processor is a generic term for a program read only memory (PRG-ROM) storing instructions, a sequencer SEQ for sequentially accessing the PRG-ROM, a decoder (DEC) for decoding the instruction from the PRG-ROM, an arithmetic logic unit (ALU) operated by the decoded instruction, a transfer bus 118 performing an input/output operation of the data PD$_{out}$, and so on. The SD$_{out}$ is serial transmitted data from a parallel/serial (P/S) converting unit.

The S/P converter 30 of the prior art is provided with a latch pulse generating unit 214, which specifies a timing for converting the serial received data SD$_{in}$ into the parallel transmitted data PD$_{out}$ in a unit of a predetermined number of n bits. LP in the figure denotes the latch pulse.

A clock CK having the same speed as that of the serial received data the SD$_{in}$ is input to the generating unit 214, and forms a Digital Phase-Locked Loop (DPLL). In this case, an interrupt is applied to the processor 20 in parallel with the output of the latch pulse LP. This latch pulse LP allows the above-mentioned conversion from SD$_{in}$ to PD$_{out}$ to be carried out with the highest priority. With respect to the interrupt, an interrupt clear must be returned to the latch pulse generating unit 214, and to this end, the processor 20 issues an interrupt clear every time the fetching of the converted parallel output data PD$_{out}$ is completed.

The serial/parallel converter 30 of the prior art shown in FIG. 10 has two problems; first, the converter lacks flexibility. In the above ISDN, the converters are used in a variety of terminal units (refer to TE in FIGS. 1 and 10) having speeds of 16 kbps, 32 kbps, 64 kbps, etc. Thus the hardware structure of the latch pulse generating unit 214 must be modified for each terminal unit (TE) having a different speed, which causes difficulties when matching the unit with the ISDN.

Second, pairs of an interrupt and an interrupt clear must be executed frequently, and therefore, the job currently being processed by the processor 20 must be set aside every time an interrupt occurs, and thus the efficiency of the processor is greatly reduced.

The bit length varying means of the present invention is constructed as a latch circuit forming a serial/parallel converter which does not employ an interrupt conversion and can cope with serial received data of any speed.

Figure 11:
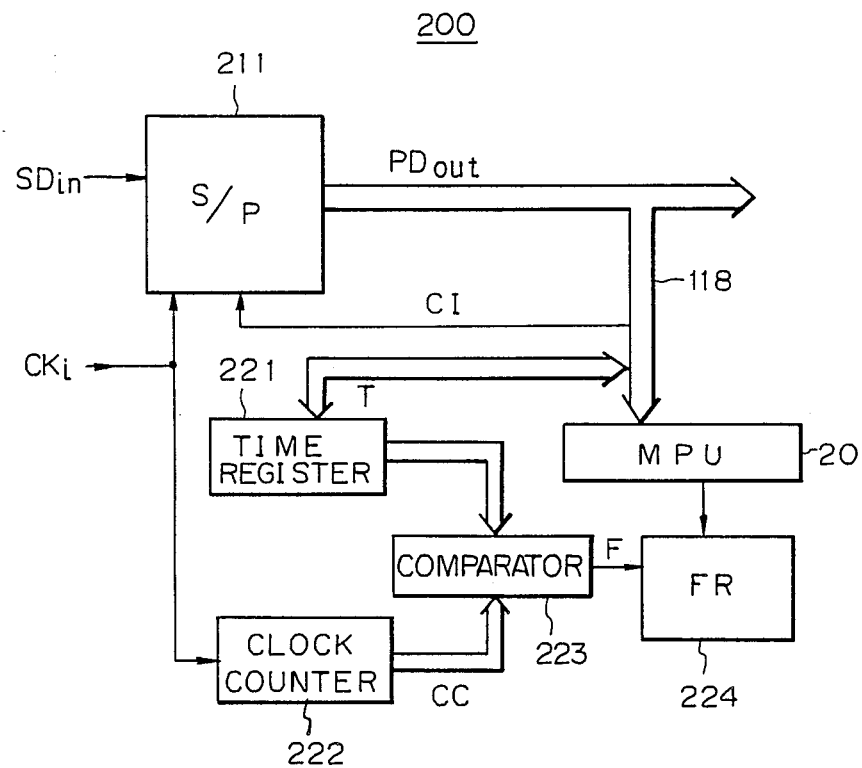
FIG. 11 is a block diagram illustrating the principle of a bit length varying means of the present invention.

FIG. 11 is a structural view showing the principle of the bit length varying means of the present invention. Note, members identical to those previously mentioned are represented by the same reference numerals or symbols. The bit length varying means, i.e., the serial/parallel converter 200 of the present invention, comprises a clock counter 222 (see COUNTER in FIG. 2) counting the clock CK$_i$ having a same speed as that of the serial received data SD$_{in}$, a time register 221 (see REG2 in FIG. 2) receiving, from the processor 20, a time value T of the clock corresponding to a number of n bits and storing the same therein, a comparator 23 (see COMPARATOR in FIG. 2) detecting a coincidence between the clock count value CC from the clock counter 22 and the time value T, and producing a coincidence flag F, and a flag register 24 (see FR in FIG. 2) for storing the coincidence flag F.

The processor 20 can freely set a time value T in the time register 221. Namely, the number of bits of the serial received data SD$_{in}$ received for conversion to parallel output data PD$_{out}$ is stored therein, and thus it is possible to cope with serial received data SD$_{in}$ of any speed, such as 16 kbps, 32 kbps, etc., without the need for a hardware change.

The processor 20, while not using an interrupt, always detects whether the coincidence flag F is generated in the flag register 224. Every time the flag is detected, the processor 20 issues a conversion instruction CI to perform the conversion, i.e., SD$_{in}$→PD$_{out}$, at every n bits. The coincidence flag F is output every time the clock count value CC of the clock counter 222 coincides with the time value T set in the time register 221. Note that the clock CK$_i$ counted by the clock counter 222 is obtained by a frequency division of an inside master clock MCK$_i$ (refer to FIG. 4), in which the required frequency dividing ratio, i.e., information about the serial received data SD$_{in}$ speed to be input next from the received line, is sent to the processor 20 via a separate path, i.e., by using a DIP switch, or via the transmission line L, or by installing another line and sending it in the form of a signal on that line. This makes it possible to cope with serial received data SD$_{in}$ of any speed, without the need for hardware modification. Furthermore, the processor 20 need not be used for complicated operations, i.e., the above "interrupt-interrupt reset", and thus the utilization efficiency of the processor 20 can be increased.

Figure 12:
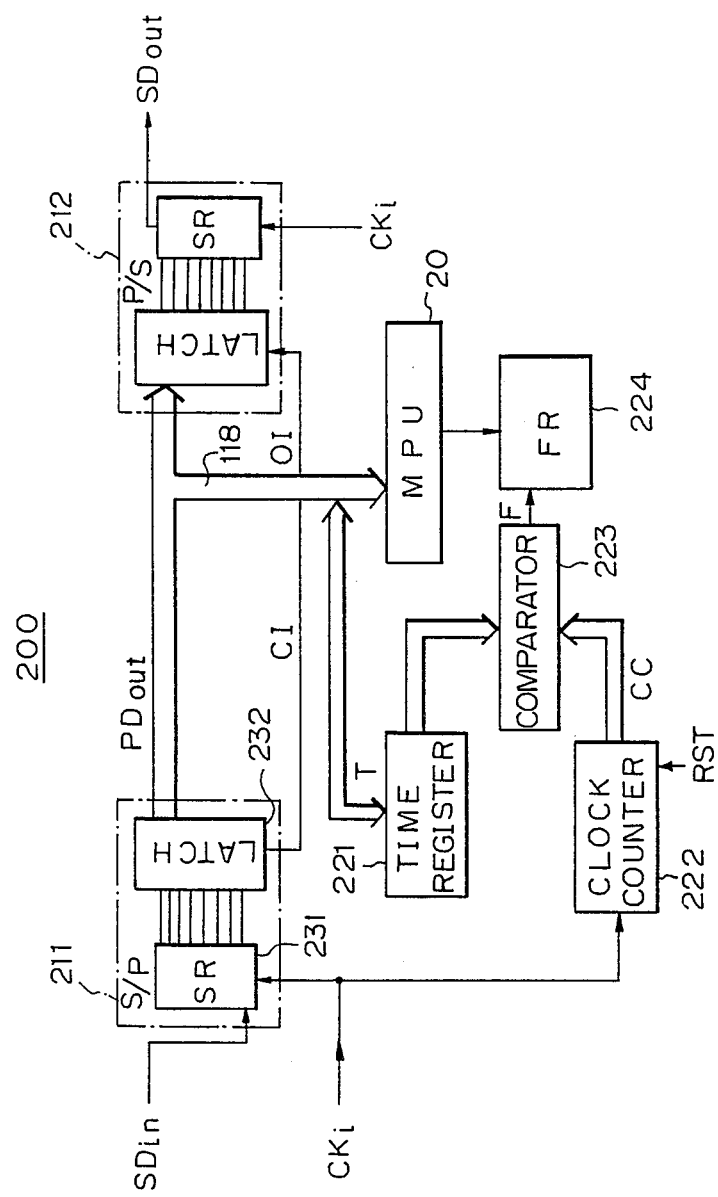
FIG. 12 is a block of the bit length varying means of the present invention.

FIG. 12 shows a specific example of the bit length varying means of the present invention. In particular, FIG. 12 shows the serial/parallel converting unit 211 in more detail. The serial/parallel converting unit (S/P) 211 comprises a shift register (SR) 231 and a latch circuit 232. The shift register 231 stores the serial received data SD$_{in}$ bit by bit, in synchronism with the clock CK$_i$, from the bottom to the top in the related figure. When, for example, 8 bits are stored therein (4 bits or 6 bits also possible), the bits are transferred to the latch circuit 232 all at once. The timing for this transfer is specified by the conversion instruction CI from the processor 20. In FIG. 12, the parallel/serial converter (P/S) 212, connected to the transmitting line, is also specifically illustrated. Note, the construction thereof is an inversion of the serial/parallel converter 211. In this case, the latch circuit is driven by an output instruction OI.

Figure 13:
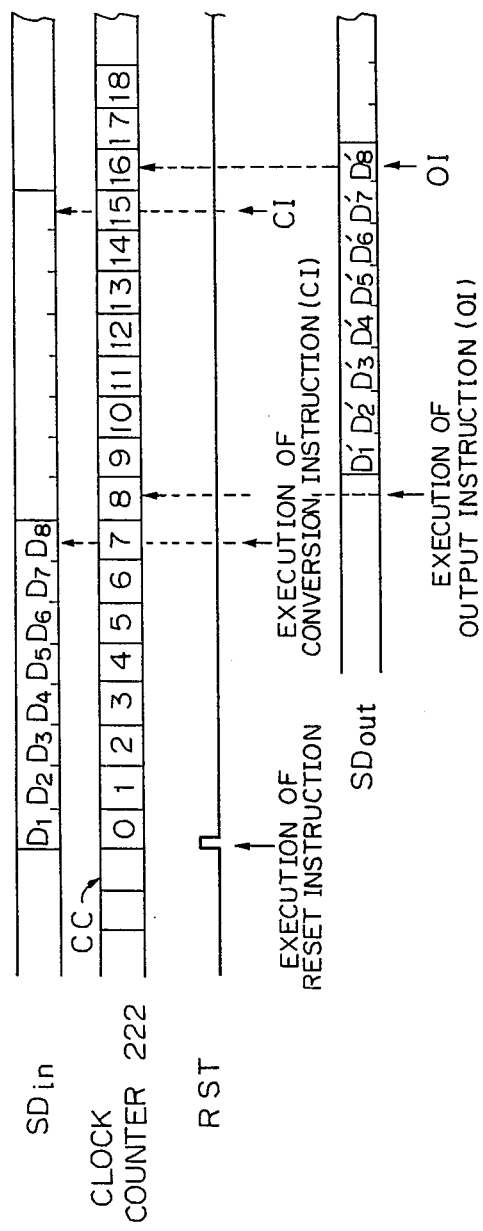
FIG. 13 is a timing chart of an operation of the bit length varying means.

FIG. 13 is a timing chart depicting an operation of the bit length varying means. First, a reset pulse RST for the clock counter 222 is output from the processor 20, and thus the clock count value CC of the clock counter 222 is made zero. Then the clock count value CC is incremented at the same pace as that of each data bit D$_1$, D$_2$, D$_3$—of the serial received data SD$_{in}$. Namely, the count value CC is increased, for example, as 0, 1, 2, 3, 4—.

Assuming that the 8 bit data is being processed, a time value T (=7) is set in the time register 221 (FIG. 12). This time value is equivalent to 8 bits at the current data transmission speed, and thus, every time the clock count value CC reaches 7, 15, 23—, the comparator 223 (FIG. 12) produces the coincidence flag F to execute the conversion instruction CI. Note, the comparator 223 produces the flag F every time the time value T reaches 7+8 (M−1) (8 denotes 8 bits, M denotes the number of received data). Thus the S/P conversion can be executed without using the above interrupt but merely by supervising the coincidence flag F.

The parallel output data PD$_{out}$ (D$_1$, D$_2$—D$_8$ of FIG. 13) fetched by the processor 20 is subjected to predetermined data processing under a reception processing program. The thus-processed data is momentarily stored in the memory (FIG. 2), and thereafter, a transmission processing program is applied thereto. Next, with execution of the output instruction OI, the proceed data is output as serial transmitted data $SD_{out}$ ($D_1'$, $D_2'$—$D_8'$ of FIG. 13) to the transmitting line of the transmission line L.

Figure 14:
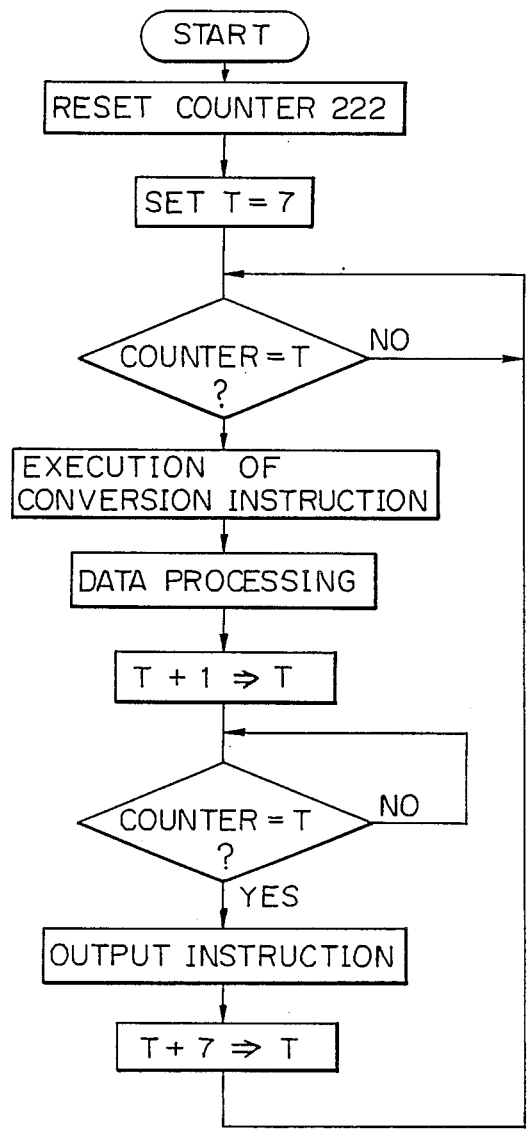
FIG. 14 is a flow chart of an operation of the bit length varying means.

FIG. 14 is a flow chart of an operation of the bit length varying means. Note, FIG. 14 is only an example thereof. In the flow chart, the step at which $T+1\rightarrow T$ indicates that, in FIG. 13, after execution of the conversion instruction at CC=7 of the clock counter 222, the output instruction OI must be executed one clock (7+1) later. Further, the step at which $T+7\rightarrow T$ indicates that a next conversion instruction CI should be executed 7 clocks (8+7) after the time at which CC=8 of the clock counter 222.

Start timing control means 300

In the above-mentioned digital communication network, a test must be carried out to maintain the network's quality. Such testing can be conducted by, for example, a supervisory unit (see SV in FIG. 1). Although the test can be conducted in various ways, the present invention uses a loopback test. In the loopback test, test data is returned, as shown in FIG. 1 by a dotted line, at a loopback point LB in the figure. The correctness of the thus returned data is checked while varying the location of the point LB in order to find a fault position. In this case, however, the transmitted data, i.e., downstream data d, and the received data, i.e., upstream data u, exist in parallel, and accordingly, the processing by the processor 20 at the terminating equipment ET (also at the terminating equipment NT) becomes very complicated. Note, in general, the test is conducted mainly by the terminating equipment ET.

Figure 15:
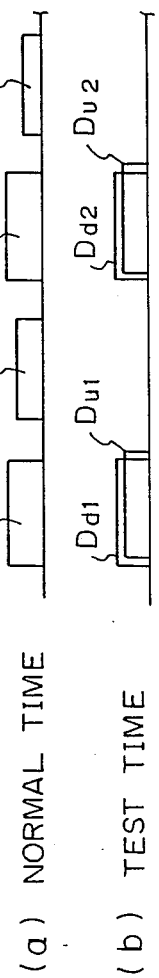
FIG. 15 is a timing chart of a flow of the transmitted and received data.

FIG. 15 is a timing chart of a flow of the transmitted and received data, wherein row (a) represents a normal time and row (b) represents a test time. At the normal time, the transmitted data (downstream data d) $D_{d1}$, $D_{d2}$—output from the processor 20 and the input data (upstream data u) $D_{u1}$, $D_{u2}$ received thereby, are clearly separated in terms of the generation timings thereof, and therefore, the processing in the processor 20 is relatively simple. At the test time, however, the timing of the transmitted data $D_{d1}$ (downstream data d) for the test overlaps the timing of the received data $D_{u1}$ (upstream data u) returned at the loopback point LB. This is because the data is delayed, at most, by a time equivalent to about one stage of a latch at the loopback point LB. As a result, the processing by the processor becomes very complicated.

Figure 16A:
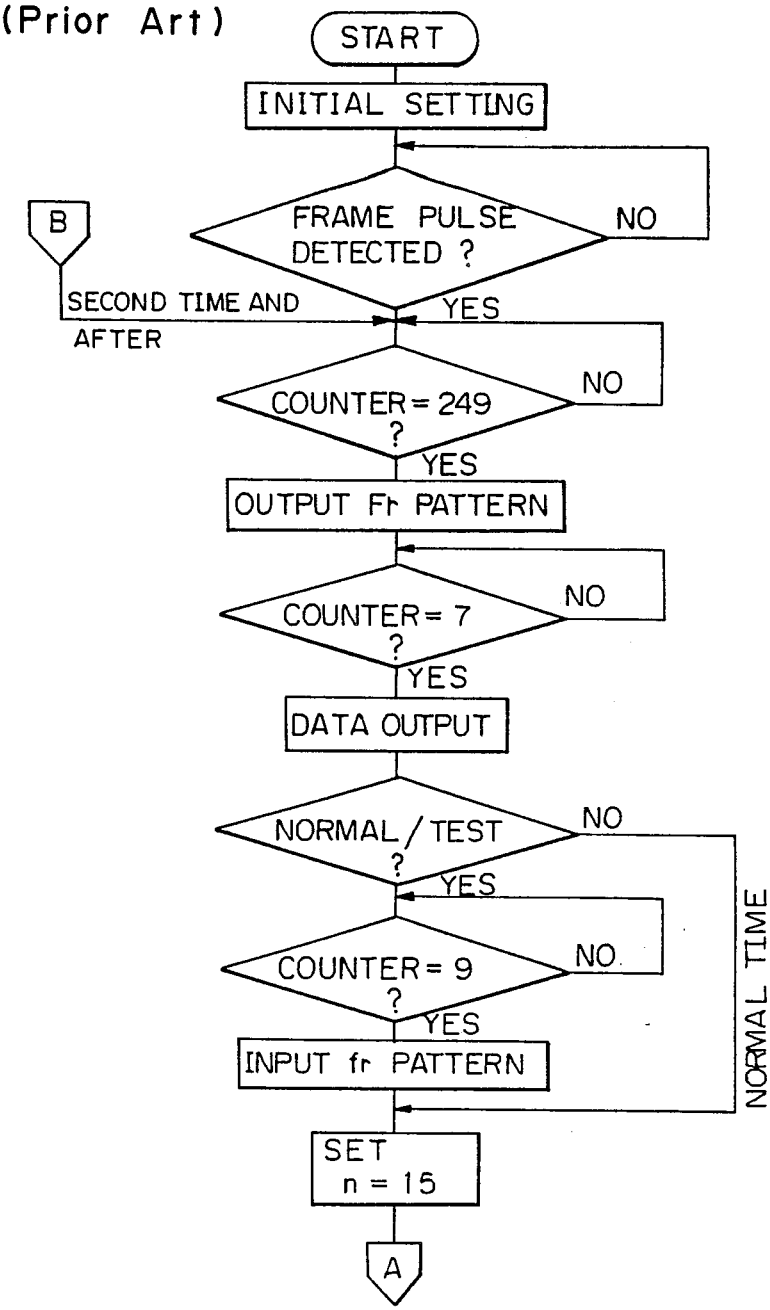
FIG. 16A and 16B are flow charts of a prior art procedure for processing the transmitted-received data.
Figure 16B:
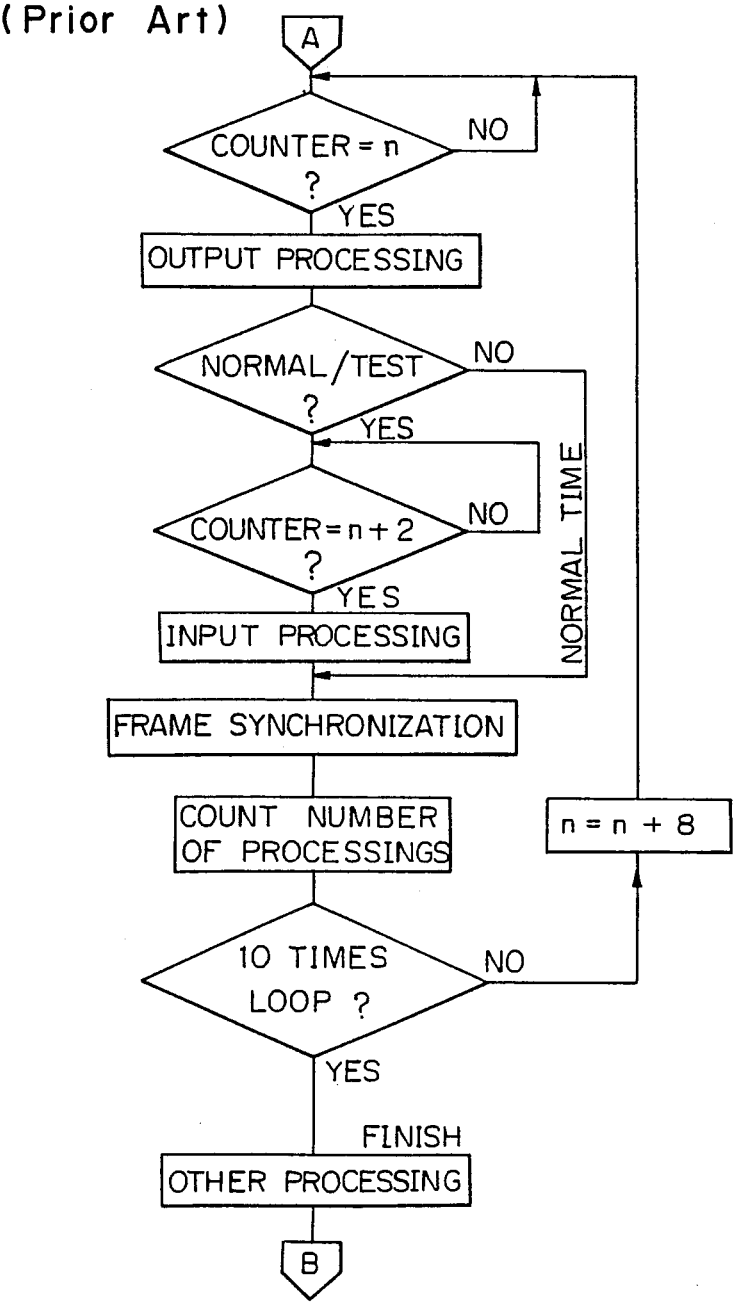

FIGS. 16A and 16B are flow charts of a prior art procedure for processing the transmitted-received data. The flow chart of FIG. 16A ends at "A", continues onto the "A" of FIG. 16B, reaches the "B" thereof, and in next cycle, starts from the "B"of FIG. 16A. In the figure, the term frame pulse denotes a pulse which indicates the beginning of each cycle constituted by each pair of downstream data and upstream data. A counter, i.e., timer counter, is used to determine a time of each cycle, and operation of the processor 20 is started by using the thus-determined time as a clock source. In an LSI for a transmission operation, preferably the operation is in synchronism with the clock of a received data, and accordingly, the above-mentioned timer counter is used to count the clock of the received data. The term Fr pattern denotes a frame pattern of the transmitted data (downstream) $D_{d1}$, $D_{d2}$—, and the term fr pattern denotes a frame pattern of the received data (upstream) $D_{u1}$, $D_{u2}$—. The term "Normal/Test"indicates a discrimination between a normal time and a test time, wherein if "NO" stands, a normal time is indicated and the steps for timing adjustment are bypassed.

According to the prior art data receiving-transmitting processing, both the program for the normal time and the program for the test time are prepared in advance, and one of these programs is selected. Namely, two programs must be prepared for normal time use and test time use, and accordingly, a problem occurs in that a large number of steps are needed. Further, another problem arises in that, since two discrimination steps, i.e., "Normal/Test", are required, the operation becomes complicated. Furthermore, yet another problem is involved in that, since the processings for both the downstream and upstream data are conducted by a single program, the program becomes complicated.

The start timing control means 300 of the present invention provides an MUX/DMUX system in which the number of discrimination steps at the normal time and test time can be reduced, a data transmission program can be made shorter, and further, a program can be used which is simply set up with an easily understood step arrangement.

Figure 17:
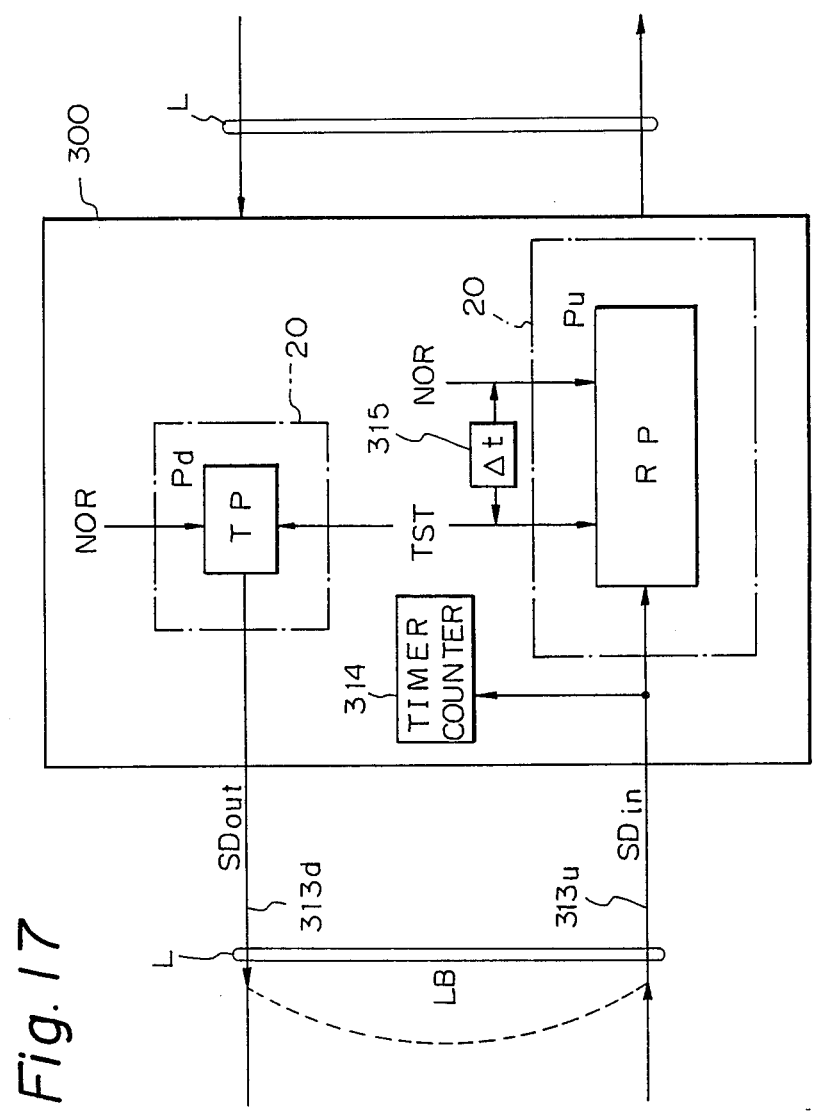
FIG. 17 is a schematic diagram showing the principle of the start timing control means.

FIG. 17 is a schematic view showing the principle of the start timing control means. Reference numeral 300 represents the start timing control means cooperating with the processor 20. The processor 20 carries out transmission processing of parallel data and outputs the related serial transmitted data $SD_{out}$ ($D_{d1}$, $D_{d2}$—of FIG. 15) via the transmitting line $313_d$, and receives, via the receiving line $313_u$, the serial received data $SD_{in}$ ($D_{u1}$, $D_{u2}$—of FIG. 15) and converts that data into parallel data to carry out reception processing. The above transmission processing is represented by TP in the figure, and the reception processing by RP.

The transmission processing TP and the reception processing RP are executed by a program $P_d$ for the downstream data and a program $P_u$ for the upstream data, respectively. Also, these processings are executed by a timer counter 314 (see TIMER COUNTER in FIG. 2) which is synchronous with the clock of the serial received data $SD_{in}$.

In the MUX/DMUX system of the present invention, the transmission processing program $P_d$ for the downstream data and the reception processing program $P_u$ for the upstream data are prepared independently and separately. Under the program $P_d$, the transmission processing TP is executed commonly at both the normal time (NOR: Normal) and the test time (TST: Test).

Under the program $P_u$ for the upstream data, however, the reception processing RP is not executed commonly at both the normal time NOR and the test time TST. The reception processing program and the transmission processing program are activated alternately, and the reception processing program is started at a predetermined elapse of time ($\Delta t$) after the execution of the transmission processing program. Note, the reception processing at the test time TST is started before the reception processing at the normal time NOR. The timer counter 314 is used for the processing of the predetermined time $\Delta t$ stored in a time register 315 (i.e., register REG3 in FIG. 2). Further, the programs $P_d$ and $P_u$ are executed alternately, where the $P_u$ is executed in response to the start of the $P_d$.

Accordingly, the $P_d$ and $P_u$ run independently and alternately under the control of the timer counter 314 and the register 315, and consequently, compared with the prior art, the processor 20 can be operated by a simpler and more easily understood program. Also, it is possible to use the transmission program alone in the program $P_d$. The step of discrimination between the test time TST and the normal time NOR will be explained later with reference to the relevant flow chart.

Figure 18:
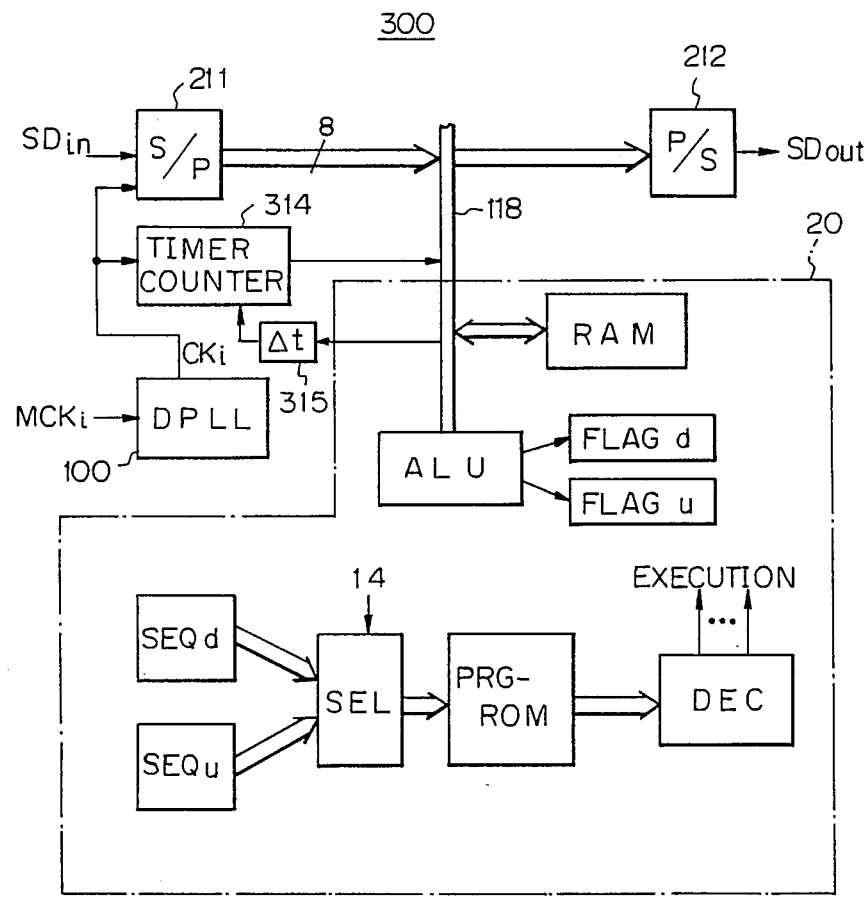
FIG. 18 is a block diagram of the start timing control means.

FIG. 18 shows an example of the start timing control means, wherein the processor 20 is illustrated in detail. As mentioned above, the converting unit (S/P) 211 converts the serial data into parallel data and the converting unit (P/S) 212 reverses that conversion. The transmission processing and the reception processing, such as a multiplex operation, demultiplex operation, scramble operation and so on, are applied to the parallel data on the bus 118 under the control of the ALU and by utilizing a random access memory RAM. The instructions for specifying the transmission processing and the reception processing are stored in a program-read only memory PRG-ROM, and the instructions are then sequentially read to an instruction decoder DEC for execution.

According to the present invention, both the transmission processing program $P_d$ for the downstream data, which deals mainly with the output processing, and the reception processing program $P_u$ for the upstream data, which deals mainly with the input processing, are stored in advance in the memory PRG-ROM and selected by sequencers $SEQ_d$ and $SEQ_u$ for a read operation through a selector SEL. The sequencer $SEQ_d$ is used for the transmitting line and the $SEQ_u$ is used for the receiving line. The ALU indicates that it is currently transmitting (downstream d) or receiving (upstream u), by using a flag d and a flag u.

A digital phase-locked loop circuit DPLL, constructed as the phase adjusting means 100, is provided and the clock $CK_i$ produced therefrom is synchronized with the serial received data ($SD_{in}$).

Figure 19:
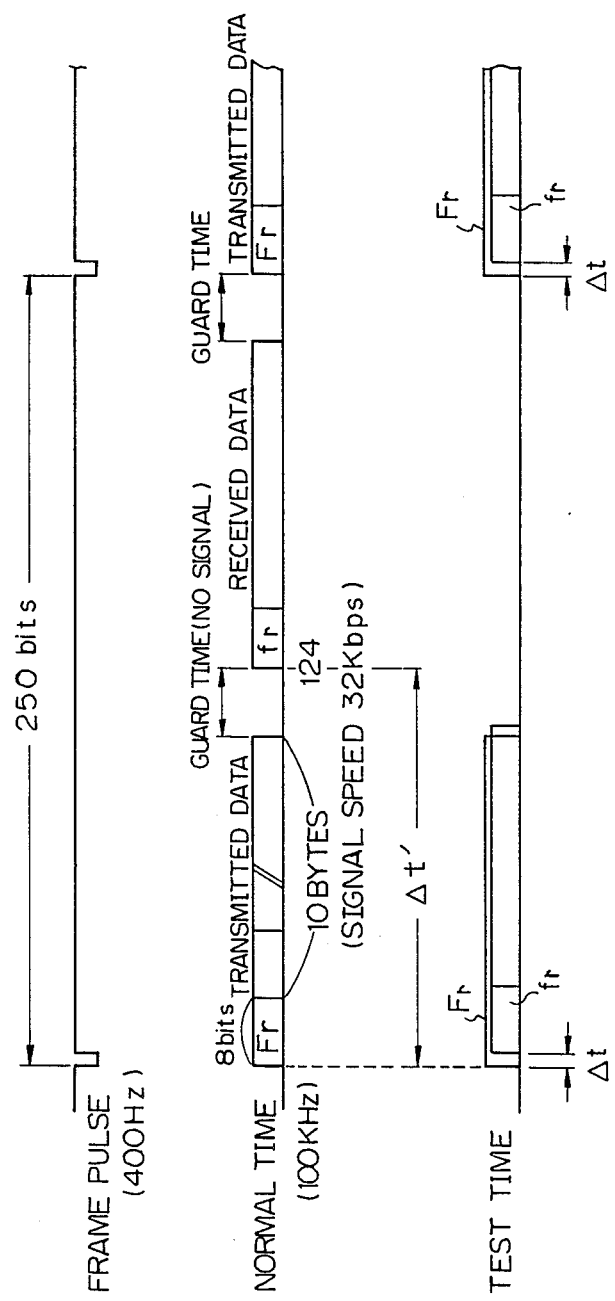
FIG. 19 is a timing chart of signal patterns at the normal time and at the test time.

FIG. 19 shows signal patterns at the normal time and at the test time, and correspond to a more detailed FIG. 15. The character Fr represents a frame pattern of the transmitted data consisting of, for example, 8 bits, and fr represents a frame pattern of the received data consisting of, for example, 8 bits, each of which is followed by an information signal consisting of, for example, 10 bytes.

Figure 20:
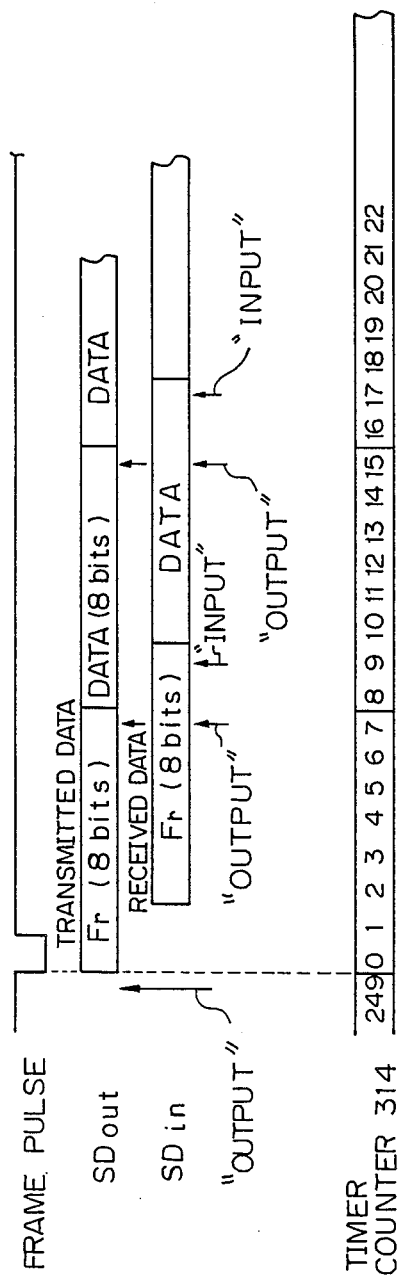
FIG. 20 is an enlarged timing chart of the test time of FIG. 19 in relation to the timer counter and the time resistor.

FIG. 20 is an enlarged timing chart of the test time of FIG. 19 in relation to the timer counter 314 and the time register 315. The timer counter 314 is incremented by, for example, 0, 1, 2 —249 every time a frame pulse occurs. The transmitted (downstream) data $SD_{out}$ is output when the count value of the timer counter 314 reaches ⌈7⌉, ⌈15⌉ —, and the received (upstream) data $SD_{in}$ is input when the count value reaches ⌈9⌉, ⌈17⌉ —. Note that the figure shows an example wherein the time difference (Δt in the time register 315 of FIG. 18) between the transmission timing and the reception timing is ⌈2⌉. The preset value (Δt) at the test time TST is shorter than the preset value (Δt') at the normal time NOR (refer to Δt and Δt' (Δt<Δt') in FIG. 19) and in the latter case, after not until completion of the transmission of the transmitted data is the reception processing applied to the received data.

Figure 21:
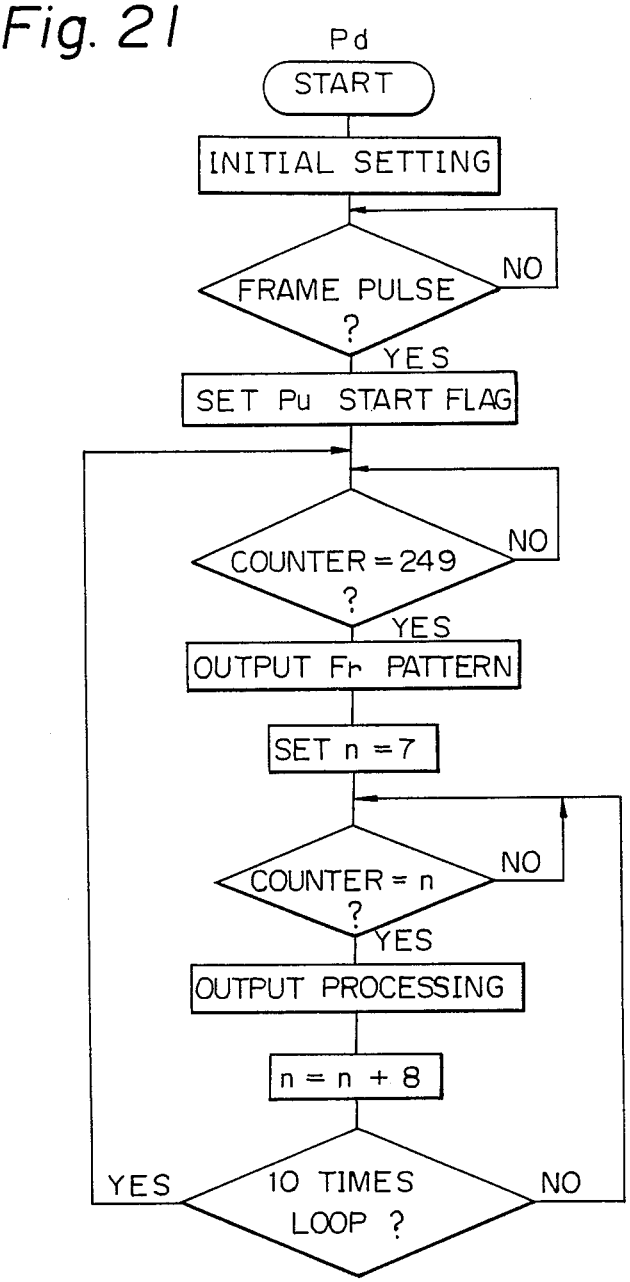
FIG. 21 is a flow chart of an example of the transmission processing program.
Figure 22:
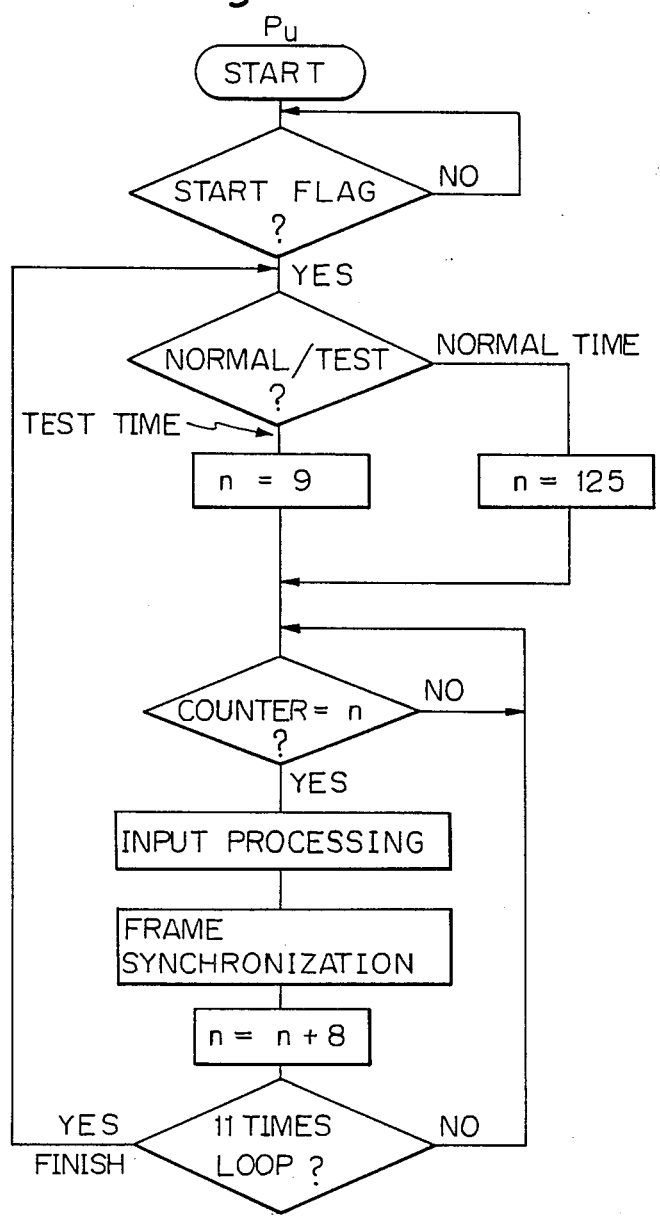
FIG. 22 is a flow chart of an example of the reception processing program.

FIG. 21 is a flow chart of an example of the transmission processing program, and FIG. 22 is a flow chart of an example of the reception processing program. When compared with the prior art flow charts of FIGS. 16A and 16B, it is apparent that the number of steps for discriminating the normal time and the test time is reduced by one, that only one output processing is carried out regardless of whether the time is the normal time or the test time, and that only one input processing is carried out regardless of whether the time is the normal time or the test time. Further, in the prior art, the programs are mixed together to form one program, as shown in FIGS. 16A and 16B, and thus become complicated, but in the present invention, two separate programs, as shown in FIGS. 21 and 22, are used and these two programs have no connection with each other, which makes the program simple. The only connection between the two programs is that one lies between the step "SET $P_u$ START FLAG" (FIG. 21) and the step START FLAG (FIG. 22). Namely, the only connection determined is that when the $P_d$ is to be started, in order to start the $P_u$ thereby.

In FIGS. 21 and 22, n denotes the count value of the timer counter counter 314, and the step wherein "counter =249" denotes a time required for completing a pair of the transmission and the reception processings in one cycle. Further the step wherein SET n=7" denotes that, in FIG. 20, the time register 315 is preset with the time required for outputting the frame pattern Fr of the first transmitted (downstream) data $SD_{out}$, and the step wherein "n=n+8" denotes that n+8 is set as the count value in the register 315, i.e., the first data (8 bits) of the $SD_{out}$ (FIG. 20) is output. Note, the counter 314 is operated as a down counter, and if ⌈8⌉ is preset in the register 315, the count value is decremented by, for example, 8, 7, 6—, and finally, a carry is output when reaching ⌈1⌉ to stop the related processing.

In FIG. 22, the step "n=9" at the test time denotes that the first input (fr pattern) of the received (upstream) data $SD_{in}$ continues up to the count value ⌈9⌉, and thereafter, the value changes to, for example, 9, 17—. The step "n=125" (normal time), however, denotes a duration time of the series of received (upstream) line data $D_u$, and thereafter, "n +8" is set n the register 315, to carry out the input operation in units of each byte, which forms, in total, an 11 times loop. During the processing of the transmission (downstream) (FIG. 21), a 10 times loop is formed, and the difference of 1 time therebetween is created because the input processing of the frame pattern fr is counted as one under the reception processing program. In FIG. 22, the step "Frame synchronization" is required because the clock is extracted, via the phase adjusting means 100, from the serial received data, and therefore, a point identifying a time as zero must be defined.

According to the above-mentioned technique, the transmission processing program $P_d$ for the downstream line and the reception processing program $P_u$ for the upstream line are executed alternately, and therefore, the processing must be executed at a speed which is twice that of the processing speed needed in the prior art, to realize an amount of processing equal to that of the prior art output processing and input processing. This means that the processor 20 must have a processing capability sufficient to cope with that requirement.

As explained above in detail, according to the present invention, a programmable multiplexing/demultiplexing system is realized, which comprises a phase adjusting means, a bit length varying means, a start timing control means and a processor. Under the control of the processor, first the phase adjusting means can variably control the phase of the clock signal; second the bit length varying means can control the length of the received data by using the adjusted clock signal to freely cope with data of various speeds; and third, the start timing control means can variably determine the start timing of the transmission and reception processing programs by using the adjusted clock signal. Accordingly, the multiplexing/demultiplexing system is programmable, and therefore, is flexible when used with the ISDN.

We claim:

1. A programmable multiplexing/demultiplexing system for receiving serial data via a receiving line using a clock signal having a phase and converting the serial data into parallel data using a latch circuit, the parallel data is read by a processor and stored in a memory for later processing of the parallel data into processed data, the processed data is output as processed serial data to a transmission line, the programmable multiplexing-/demultiplexing system comprising:
   phase adjusting means for variably controlling the phase of the clock signal using the processor in accordance with the parallel data;
   bit length varying means for variably controlling a length of the parallel data latched, by the clock signal generated by said phase adjusting means, using the processor; and
   start timing control means for varying a start timing of the processing of the parallel data by the processor, when the processing is to be started a predetermined time after the processing of the processed serial data.

2. A system as set forth in claim 1, wherein said system uses an external clock obtained from the serial data, a master clock, and an internal clock as the clock signal, and
   wherein said phase adjusting means comprises:
      a phase adjusting unit for carrying out a pulse insertion or a pulse removal, in pulse units, to or from the master clock;
      a frequency divider, operatively connected to said phase adjusting unit, for dividing the frequency of the master clock output from said phase adjusting unit to produce the internal clock;
      a phase comparing unit, operatively connected to said frequency divider, for receiving the internal clock as a first input and the external clock as a second input and detecting, in clock units, whether the internal clock is lagging or leading the external clock;
      a counter, operatively connected to said phase comparing unit, having an initial value K, where K is a positive integer of at least 2, preset therein as a protection stage number, for producing a carry output when either a phase lag or a phase lead occurs K times continuously;
      a protection state number register, operatively connected to said counter and the processor, for storing the protection stage number; and
      a differentiator, operatively connected to said phase adjusting unit and said counter, for converting the carry output into a pulse synchronized with the master clock.

3. A system as set forth in claim 2, wherein said counter is an up/down counter.

4. A system as set forth in claim 2, wherein said phase adjusting unit first produces both the master clock and an inverted master clock shifted in phase by $\pi$ radians relative to the master clock and then selectively switches between the master clock and the inverted master clock to carry out a phase adjustment.

5. A system as set forth in claim 2, wherein the processor sets the protection stage number in said protection stage number register such that the protection stage number, before an acquisition of synchronism, is smaller than after an acquisition of synchronism.

6. A system as set forth in claim 2, wherein said programmable multiplexing/demultiplexing system is contained on a single integrated circuit.

7. A system as set forth in claim 1, wherein the latch circuit is formed as a serial/parallel converting unit, and
   wherein said bit length varying means comprises:
      a clock counter which counts a clock having the same frequency as that of the serial data,
      a time register, operatively connected to the processor, for receiving, from the processor, a time value corresponding to n bits, where n is a positive integer of at least 2, of the clock, and stores the value therein,
      a comparator, operatively connected to said time register and said clock counter, for detecting coincidence between a count value of said clock counter and the time value and produces a coincidence flag, when a coincidence occurs, and
      a flag register, operatively connected to said comparator and the processor, for storing the coincidence flag, whereby the processor detects an occurrence of a generation of the coincidence flag and issues a conversion instruction to said serial/parallel converting unit directing the parallel data to be latched by the latch circuit.

8. A system as set forth in claim 7, wherein the processor generates an output instruction, and
   wherein said system further comprises a parallel/-serial converting unit, operatively connected to the processor, wherein the processed data is momentarily latched and the parallel/serial converting unit is then activated by the output instruction, issued from the processor, to transmit the processed data serially to the transmitting line therefrom.

9. A system as set forth in claim 8, wherein the processor first issues the conversion instruction to be executed for the parallel data and then issues the output instruction to be executed for the processed data.

10. A system as set forth in claim 9, wherein the conversion instruction is issued by the processor under a reception processing program, and the output instruction is issued by the processor under a transmission processing program.

11. A system as set forth in claim 10, wherein the reception processing program and the transmission processing program are activated alternately.

12. A system as set forth in claim 10, wherein the reception processing program is started a predetermined elapse of time after the transmission processing program.

13. A system as set forth in claim 7,
   wherein the processed data is converted by the parallel/serial converting unit into serial processed data, and thereafter, the serial processed data is transmitted, under the transmission processing program, to the transmission line, and after completion of the transmission of the processed serial data, the serial data is received from the receiving line and converted into parallel data by said serial/parallel converting unit and the reception processing program is applied thereto, wherein said start timing control means comprises a timer counter and a delay register, both said timer counter and said delay register adjust the start timing of the reception processing program in accordance with the transmission processing program, wherein at a normal time, the processed data is converted by the parallel/serial converting unit into the processed serial data, and thereafter, the processed serial data is transmitted to the transmission line under the transmission processing program, and after completion of the transmission of the processed serial data, the serial data is received, via the receiving line, at the serial/parallel converting unit and converted into the parallel data and the reception processing program is applied thereto to perform a reception process, and wherein at a test time, the transmission line and the receiving line are connected through a loopback point, and while test data is transmitted as processed serial data by the parallel/serial converting unit to the transmission line, the test data can be received via the receiving line by using said timer counter and said delay register to which the processor has set a test preset value, the test present value being shorter than a preset normal value used at the normal time.

14. A system as set forth in claim 13, wherein said clock counter is driven synchronously with the serial data.

15. A system as set forth in claim 13, wherein the reception processing program and the transmission processing program are activated alternately.

16. A system as set forth in claim 1, wherein the processed data is converted into serial processed data, and thereafter, transmitted to the transmission line by the processor, and after completion of the transmission of the processed serial data, the serial data is received from the receiving line and converted into parallel data, and a reception processing program is applied thereto to perform reception processing by the processor, wherein said start timing control means comprises a timer counter and a delay register, both said timer counter and said delay register adjust the start timing of the reception processing program in accordance with a transmission processing program, wherein at a normal time, the processed data is converted into the processed serial data, and thereafter, the processed serial data is transmitted to the transmission line under the transmission processing program, and after completion of the transmission of the processed serial data, the serial data is received, via the receiving line, and converted into the parallel data and the reception processing program is applied thereto to perform reception processing, and wherein at a test time, the transmission line and the receiving line are connected through a loopback point, and while transmitting test data as processed serial data to the transmission line, the test data can be received via the receiving line, by using said timer counter and said delay register to which the processor has set a test preset value, the test preset value being shorter than a normal preset value used at the normal time.

17. A system as set forth in claim 16, wherein the transmission processing program and the reception processing program are activated alternately.

18. A system as set forth in claim 16, wherein the latch circuit is formed as a serial/parallel converting unit, and wherein said bit length varying means comprises:
a clock counter for counting the clock signal having the same frequency as the serial data,
a time register, operatively connected to the processor, for receiving, from the processor, a time value corresponding to n bits of the clock signal, and stores the value therein,
a comparator, operatively connected to said time register and said clock counter, for detecting coincidence between a count value of said clock counter and the time value and produces a coincidence flag, when a coincidence occurs, and
a flag register, operatively connected to said comparator and the processor, for storing the coincidence flag, whereby the processor detects an occurrence of a generation of the coincidence flag and issues a conversion instruction to said serial/parallel converting unit directing the parallel data to be latched by the latch circuit.

19. A system as set forth in claim 16, wherein said system uses an external clock detained from the serial data, a master clock, and an internal clock as the clock signal, and wherein said phase adjusting means comprises:
a phase adjusting unit for carrying out a pulse insertion or a pulse removal, in pulse units, to or from a master clock;
a frequency divider, operatively connected to said phase adjusting unit, for dividing the frequency of the master clock output from said phase adjusting unit to produce the internal clock;
a phase comparing unit, operatively connected to said frequency divider, for receiving the internal clock as a first input and the external clock as a second input and detecting, in clock units, whether the internal clock is lagging or leading the external clock;
a counter, operatively connected to said phase comparing unit, having an initial value K present therein as a protection stage number, for producing a carry output when either a phase lag or a phase lead occurs K times continuously;
a protection state number register, operatively connected to said counter and the processor, for storing the protection stage number; and
a differentiator, operatively connected to said phase adjusting unit and said counter, for converting the carry output into a pulse synchronized with the master clock.

20. A system as set forth in claim 1, wherein said programmable multiplexing/demultiplexing system is contained on a single integrated circuit.

21. A programmable multiplexing/demultiplexing system for receiving a number of bits of serial data from a digital communication network, comprising:
control means for processing data and storing a protection stage number and a bit number;
phase adjusting means for receiving an external clock signal from the digital communication network and generating an internal clock signal synchronized with the external clock signal in dependence upon the protection stage number;

bit length varying means for receiving the bit number from said control means and issuing a coincidence signal when the number of bits of serial data received equals the bit number; and latch means for receiving the serial data from the digital communication network using the internal clock signal and for converting the serial data received into parallel data in dependence upon the coincidence signal.

22. A system as set forth in claim 21, wherein said control means includes a predetermined test delay, a predetermined normal delay, a transmission processing program and a reception processing program, and wherein said programmable multiplexing/demultiplexing system further comprises start timing control means for independently and alternately executing the transmission processing program and the reception processing program, the reception processing program begins execution of one of the predetermined normal delay and the predetermined test delay after the transmission processing program begins execution, the predetermined test delay is shorter than the predetermined normal delay, during normal operation the predetermined normal delay is used and no overlap of the execution of the processing programs occurs, but during loopback testing the predetermined test delay is used and results in overlap of execution of the processing programs.

23. A system as set forth in claim 22, wherein said programmable multiplexing/demultiplexing system is contained on a single integrated circuit.

24. A method for receiving serial data from a digital communication network, comprising the steps of:

(a) storing a protection stage number and a bit number in registers;

(b) receiving the serial data and an external clock signal from the digital communication network;

(c) issuing a coincidence signal when the number of bits of serial data received equals the bit number;

(d) generating an internal clock signal synchronized with the external clock signal in dependence upon the protection stage number;

(e) converting the serial data received in step (b) into parallel data in dependence upon the coincidence signal;

(f) processing the parallel data into processed parallel data; and (g) converting the processed parallel data into processed serial data;

(h) transmitting the processed serial data on the digital communication network.

25. A method as set forth in claim 24, wherein the digital communication network is an integrated service digital network.

* * * * *

UNITED STATES PATENT AND TRADEMARK OFFICE
CERTIFICATE OF CORRECTION

PATENT NO. : 4,975,913

DATED : December 4, 1990

INVENTOR(S) : Toshiaki Watanabe et al.

It is certified that error appears in the above-identified patent and that said Letters Patent is hereby corrected as shown below:

Col. 4, line 10, " $\overline{10}$ " s/b -- $\overline{10}$ --.

Col. 5, line 45, "-3" s/b -- $\overline{-3}$ --.

Col. 6, line 4, "e,ovs/MCK/ $_i$at" s/b --MCK$_i$ and $\overline{MCK}_i$ at--.

Col. 9, line 5, "proceed" s/b --processed--.

Signed and Sealed this

Twenty-ninth Day of December, 1992

*Attest:*

DOUGLAS B. COMER

*Attesting Officer*      *Acting Commissioner of Patents and Trademarks*